United States Patent [19]

Tum

[11] Patent Number: 4,834,025
[45] Date of Patent: May 30, 1989

[54] TIMELY, QUANTITATIVE AND AUTOMATIC FEEDING MACHINE

[76] Inventor: Chan-lin Tum, 1st. Fl., No. 68-4 Wang-an St., Mu-Cha Distric, Taipei, Taiwan

[21] Appl. No.: 72,024

[22] Filed: Jul. 10, 1987

[51] Int. Cl.⁴ .............................................. A01K 5/00
[52] U.S. Cl. .................. 119/51.5; 119/51 R
[58] Field of Search .................. 119/51 R, 51.5, 52 R, 119/56 R; 222/463

[56] References Cited

U.S. PATENT DOCUMENTS

| | | | |
|---|---|---|---|
| 1,364,003 | 12/1920 | Smith | 119/56 R |
| 1,682,614 | 8/1928 | Guertin | 119/51.5 |
| 2,905,144 | 9/1959 | Prigg, Jr. | 119/5 |
| 3,525,315 | 8/1970 | Lange | 119/51.5 X |
| 3,581,711 | 6/1971 | Bates | 119/56 R X |

*Primary Examiner*—Robert P. Swiatek
*Attorney, Agent, or Firm*—Balogh, Osann, Kramer, Dvorak, Genova & Traub

[57] ABSTRACT

An automatic feeding machine having a pivotally supported gravity lever for controlling a pivotally supported feeding lever. One side of the gravity lever has a weight overlapping an arch on one end of the feeding lever, on the other side of the gravity lever there is mounted a water container for receiving water from a source. The feeding lever has a feeding stopper on the other end to seal the feeding bucket. The levers are pivotally supported by shafts mounted inside a housing, the levers lying along a common longitudinal axis. A predetermined amount of water in the water bucket will initiate pivotal movement of said gravity level to free the arch end and cause pivotal movement of the feeding lever to unseal the feeding bucket, which may also be provided with a damper to control the amount of feed being dispensed.

4 Claims, 5 Drawing Sheets

TIMELY, QUANTITATIVE AND AUTOMATIC FEEDING MACHINE

BACKGROUND OF THE INVENTION

Some people love to raise some lovely pets in their homes such as fish or birds. Not only because their pets can make them happy, but also because the pets are interesting exhibits. That is the reason why the pets are so popular in every family. People are satisfied with the wonderful feelings when they feed their fishes or birds and look at the interesting ways they eat their foods.

The pets, however, require proper care and have to be fed regularly every day. Sometimes the feeding is delayed or overlooked. Sometimes, different persons in the household may feed the pets without realizing that the pets were already fed. Moreover, when the whole family goes travelling for many days, the pets would suffer from hunger and perhaps die. Sometimes even the big fish prey on the small ones. The foregoing problems can be overcome with an automatic machine which will feed the pets queantitatively and timely. This invention is designed for meeting the above needs.

SUMMARY OF THE INVENTION

This invention relates to an automatic feeding machine which will dispense a fixed amount of food at a proper time as determined by a pet owner.

There are two sets of levers. One of them is called gravity lever. On the end of the gravity lever there is mounted a weight and on the other end is a water container. The container receives water through a narrow pipe from a water source. For example, the water source can be a water filter in a fish tank. A feeding lever has an arch at one end and a feed stopper at the other end to seal off a feed outlet on a feed bucket. The arch is overlapped by the weight on the gravity lever. When the water container becomes filled with water, it overbalances the weight and the gravity lever will lose its balance and the water container will pivot downwardly. At the same moment, the feeding lever will lose its balance and cause the stopper to unseal the feed outlet. In this way, the stopper will permit the feeding bucket to dispense feed into the water for the fish to eat. After the water pours out of the water container, the weight will reassert itself and bring the gravity lever to its balanced position. This will make the weight to press down on the arch on one side of the feeding lever causing it to position the stopper against the feed outlet.

DETAILED DESCRIPTION

Figure 1:
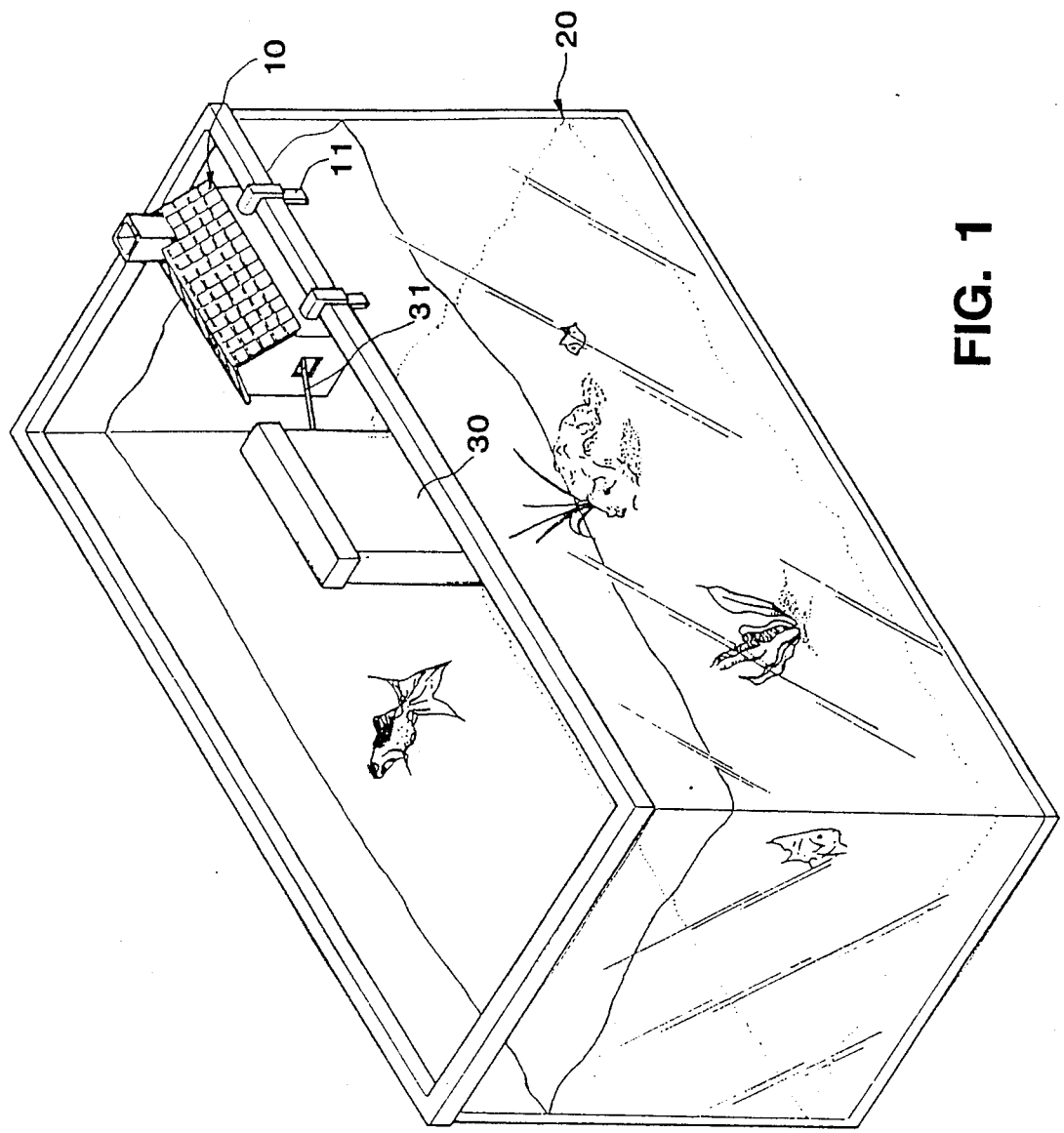
FIG. 1 illustrates the first embodiment of the automatic feeding machine according to the present invention.

FIG. 1 is directed to a first embodiment of the present invention for feeding fish. A feeding device 10 is attached and supported on the edge of a fish tank 20 by clips 11. The feeding device may be as a small house with a red roof.

The feeding device 10 is coupled to a water filter 30 by a narrow pipe 31. The filter 30 is located higher than the feeding device 10 in order to allow water flow from the filter 30 to a water container 44 through the narrow pipe 21 due to capillary action.

Figure 2:
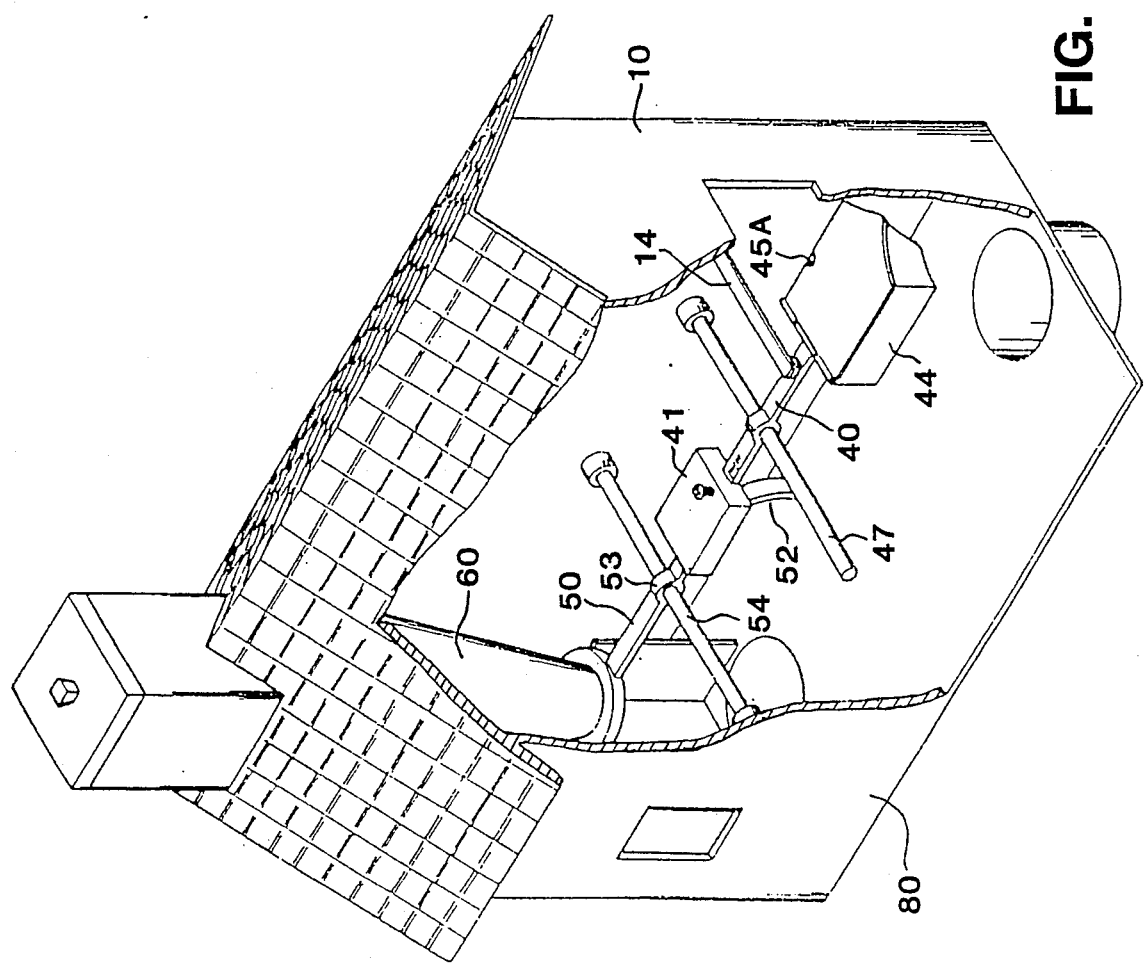
FIG. 2 is a fragmental sectional view of this invention.
Figure 3:
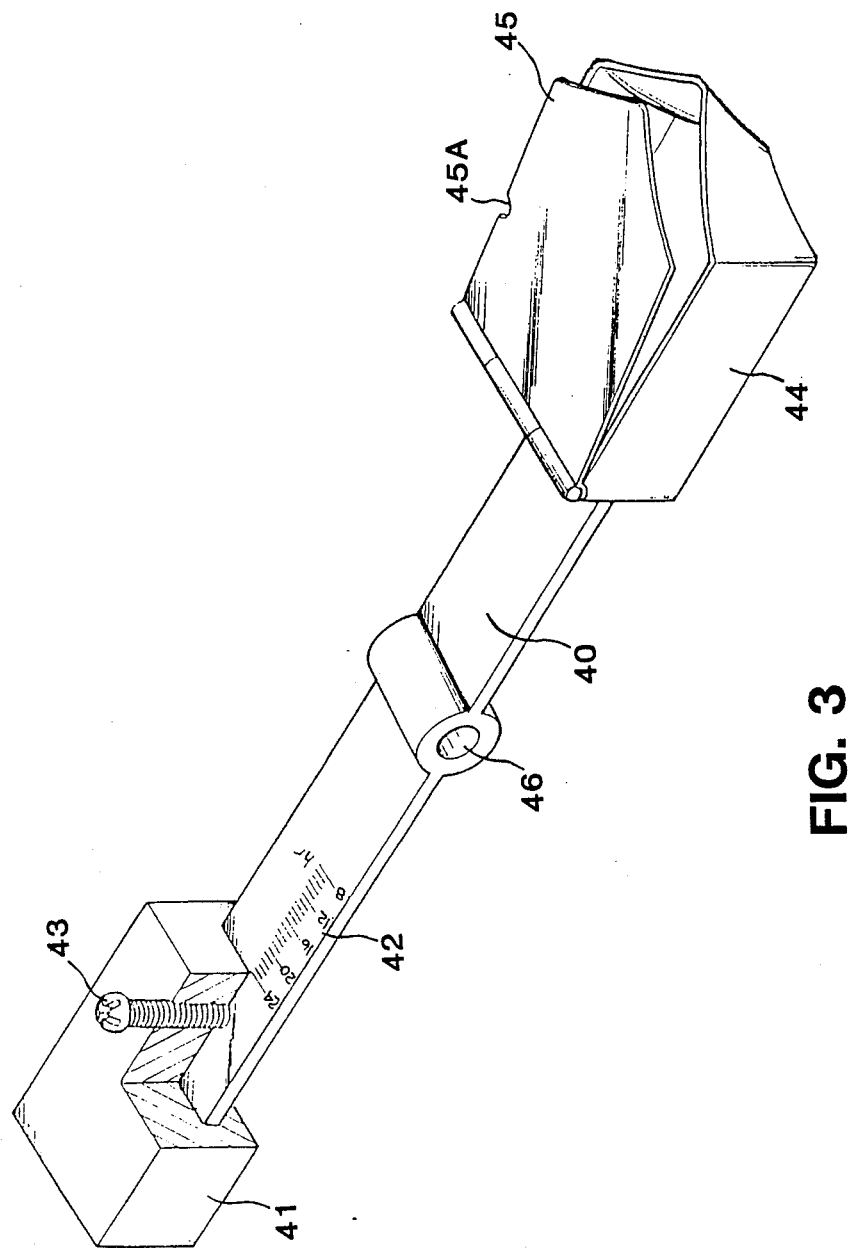
FIG. 3 is a perspective view of a gravity lever structure in the present invention.

FIG. 2 and FIG. 3 illustrate the present invention, which comprises a gravity lever 40 having at one end the container 44 and an adjustable weight 41 at the other end, a feeding lever 50 having at one end an arch 52 and a feed stopper lever 51 at the other end. Both levers are positioned along common axis with the arch 52 abutting below the weight 41. The weight 41 can be adjusted along the length of the gravity lever 40 by means of a set screw 43. Some gradations 42 containing numerals 8, 12, 16, 20, 24 are cut into the surface of the gravity lever 40. The weight 41 can be slid to a position of the proper gradation to control the feeding time. The container 44 has a lid 45 which prevents water from evaporating. A small opening 45A in the lid 45 allows water to flow from the filter 30 through the pipe 31 by capillary action.

In the mid-section of the gravity lever 40 there is provided a shaft hole 46 to admit a shaft (not shown) for pivotally supporting the lever 40 from the wall 80 of the device 10. The gravity lever 40 can pivot up and down as a result of water or lack of water in the container 44. Just like the gravity lever 40 the feeding lever 50 also has a shaft hole 53 which admits a shaft (not shown) which pivotally supports the feeding lever 50 inside the device 10. Therefore, the feeding lever can pivot up and down as the weight 41 moves down and up.

Figure 4:
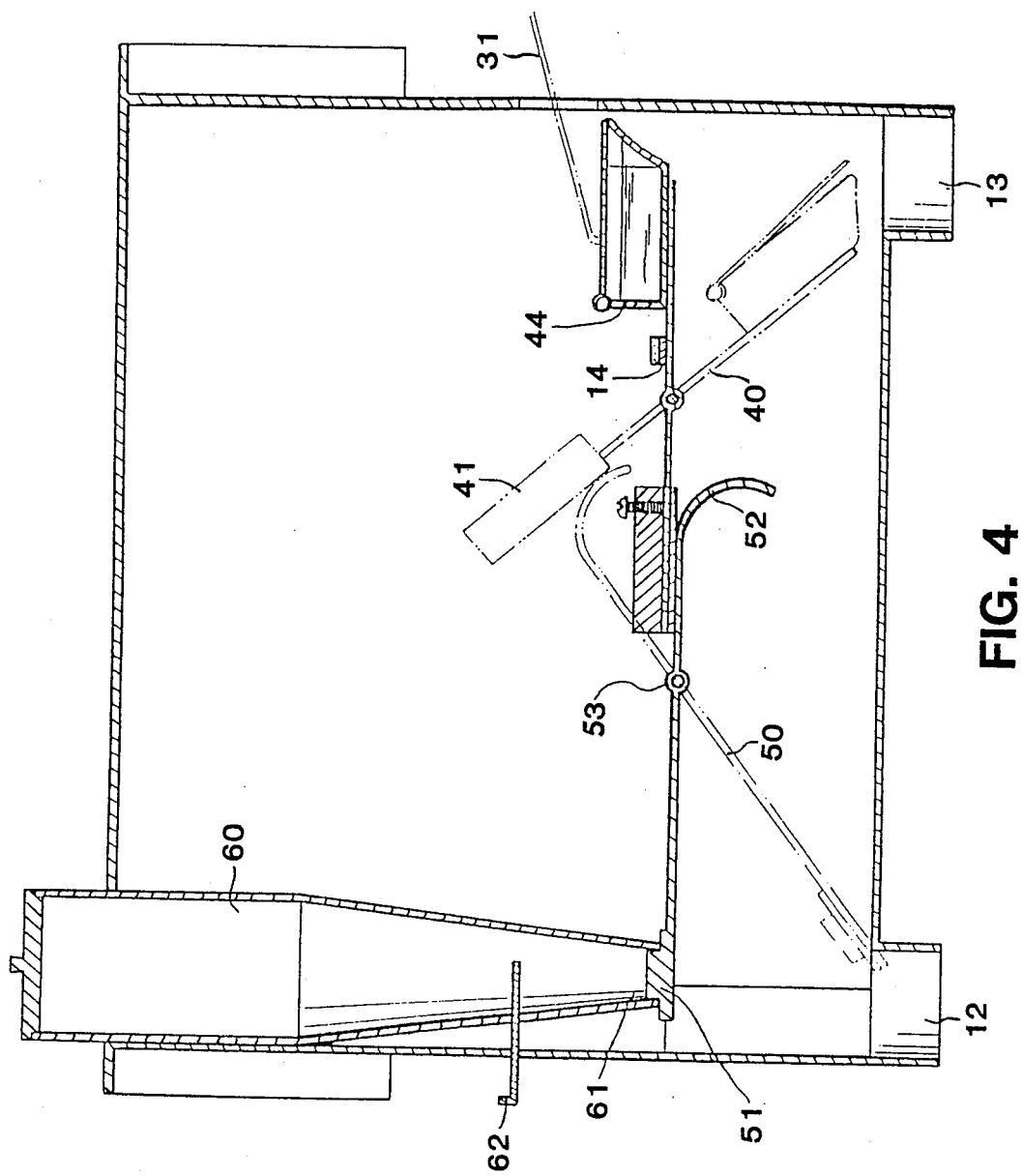
FIG. 4 is a side view of the present invention.

After setting the gravity lever 40 and the feeding lever 50, the two levers are in balance just like the FIG. 4. shows. The weight 41 on the gravity lever 40 pressing upon the arch 52 of the feeding lever 50 will make the stopper 51 move up to seal a mouth 61 of the feeding bucket 60 so that the feed does not spill out. One the other hand, the water container 44 on the gravity lever 40 will begin to receive the water from the water filter 30. When the amount of water accumulates in the water bucket 44, it will overbalance the weights 40 and the gravity lever 40 will lose its balance and the water container 44 will swing down. Then, the weight 41 will rise up to allow the arch 52 of the feeding lever 50 to rise up. The feeding stopper 51 will move downwardly and permit the feed to spill from the feeding bucket 60 for fish to eat. But, when the water container 44 slants downwardly the water in it will pour out into the fish tank. Then, the weight 41 will restore the water bucket 44 to a level position. At the same time, weight 41 will press upon the arch 52 of the feeding lever 50 and the feeding stopper 51 will rise up to seal the mouth 61 of the feeding bucket 60. The set will return to its original balance. By repeating these actions, the machine can feed the pets quantitatively and timely.

The machine 10 is provided with a small hole 12 to permit the feed to fall into the tank 20 and a hole 13 to permit the water flowing out of the water container 44 to flow into the tank 20.

A magnet 14 is positioned above the gravity lever 40, adjacent the water container 44. This magnet attracts the gravity lever, which is made from iron, to prevent oscillation of the two levers while they are approaching their balance. The magnet 14 makes the balance more firm.

In addition, there is an adjustable damper 62 which can regulate the amount of feed falling through the hole 61 of the feeding bucket 60.

Figure 5:
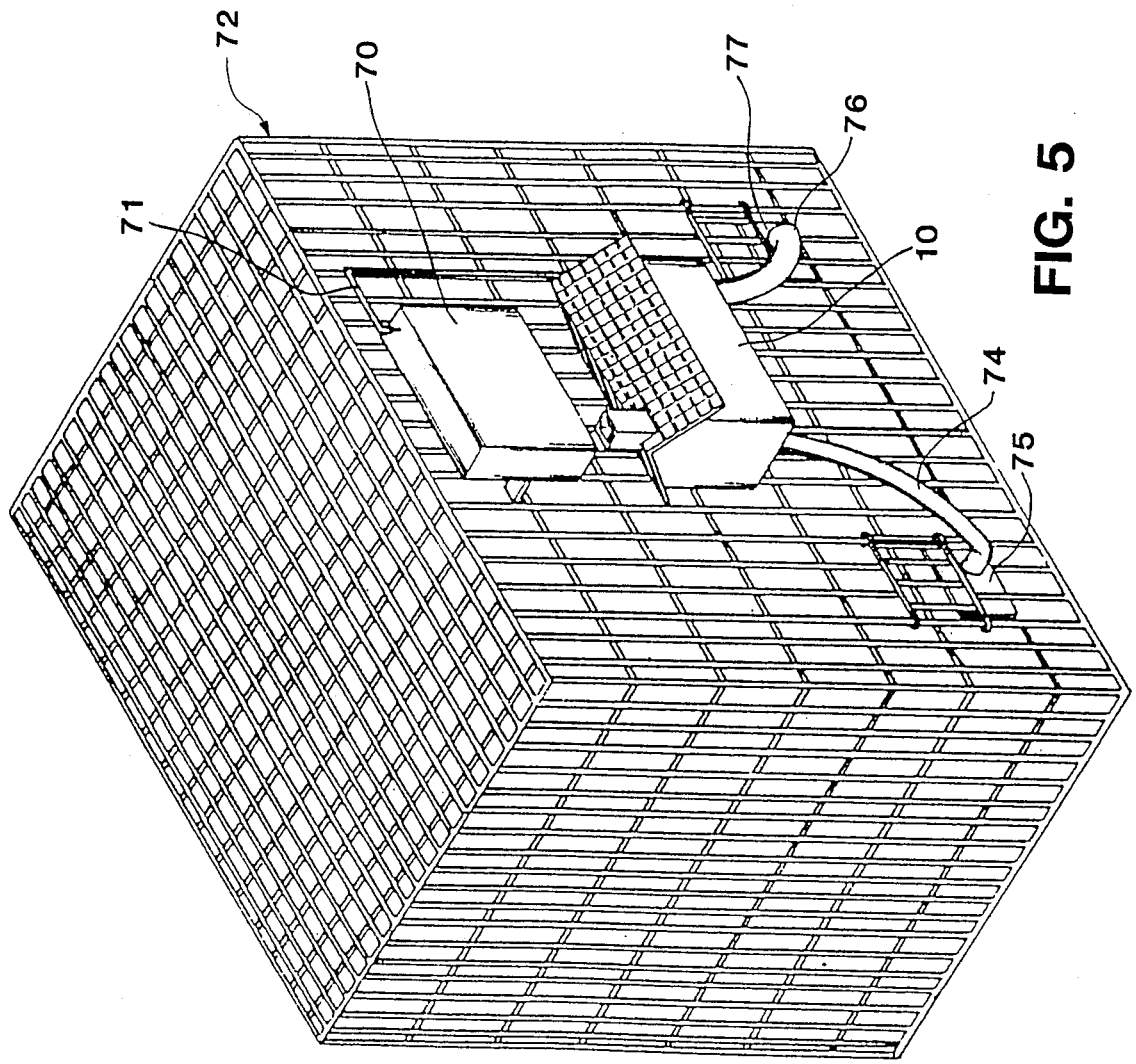
FIG. 5 is another embodiment of the present invention

The invention not only can feed fish but also can feed birds or other small animals which eat grain feed. Referring to FIG. 5, the machine 10 can feed a bird. A water can 70 is attached to a bird cage 72 and a capillary conduit 71 permits the water to flow from the can 70 into the water container 44. The machine dispenses feed which slides down a chute 74 into a feeding tray. The water in the water bucket 44, when it is unbalanced, flows through a conduit 76 into a water tray 77 inside the cage 72.

I claim:

1. An automatic feeding machine comprising:
   a housing,
   a gravity lever, which is made of iron, has a weight on one end and a water container on the other, a shaft hole disposed in the middle of said gravity lever for receiving a shaft secured on an interior of said housing,
   a feeding lever has a feeding stopper on one end and an arch on the other, a shaft hole disposed in the middle of said feeding lever for receiving a shaft secured on the interior of said housing,
   said levers being aligned with each other along a common longitudinal axis with the weight ends of the gravity lever overlapping the arch of said feeding lever,
   a feeding bucket for receiving grain feed; said feeding bucket having a dispensing outlet, an adjustable damper inside the feed bucket for controlling the amount of feed being fed to the dispensing outlet, when the two levers are balanced with respect to each other the weight will press down on the arch of the feeding lever and pivot the feed lever to abut the feed stopper against said dispensing outlet to stop dispensing of the feed, means for feeding water into said water container which, when full of water, will pivot downwardly and cause the arch end to pivot upwardly and the feed stopper to pivot downwardly to open said dispensing outlet, and a magnet secured to the interior of the housing for contacting an upper surface of the gravity lever for preventing oscillation of the gravity lever when it reaches a balanced condition.

2. A feeding machine according to claim 1, including means for adjusting the position of said weight along said gravity lever.

3. A feeding machine according to claim 2, including gradations on said gravity lever for properly setting said weight with said adjusting means.

4. A feeding machine according to claim 1, wherein said water container is provided with a lid to reduce evaporation, said lid having a small hole for receiving water from said water feeding means.

* * * * *